United States Patent
Lecerf et al.

(10) Patent No.: US 9,410,394 B2
(45) Date of Patent: Aug. 9, 2016

(54) METHODS FOR MINIMIZING OVERDISPLACEMENT OF PROPPANT IN FRACTURE TREATMENTS

(71) Applicant: Schlumberger Technology Corporation, Sugar Land, TX (US)

(72) Inventors: Bruno Lecerf, Houston, TX (US); Chad Kraemer, Katy, TX (US); Timothy L. Pope, Cheyenne, WY (US); Dean M. Willberg, Salt Lake City, UT (US); Zinaida Usova, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 14/103,152

(22) Filed: Dec. 11, 2013

(65) Prior Publication Data
US 2015/0159465 A1      Jun. 11, 2015

(51) Int. Cl.
| | | |
|---|---|---|
| *E21B 43/27* | (2006.01) | |
| *E21B 33/13* | (2006.01) | |
| *E21B 43/267* | (2006.01) | |
| *C09K 8/516* | (2006.01) | |
| *C09K 8/80* | (2006.01) | |

(52) U.S. Cl.
CPC ............... *E21B 33/13* (2013.01); *C09K 8/516* (2013.01); *C09K 8/80* (2013.01); *E21B 43/267* (2013.01); *C09K 2208/08* (2013.01); *C09K 2208/18* (2013.01)

(58) Field of Classification Search
CPC ....... E21B 43/27; E21B 43/19; E21B 43/267; E21B 43/14; C09K 8/62

USPC ......... 166/308.1, 308.2, 305.1, 308.3, 308.4, 166/308.5
See application file for complete search history.

(56) References Cited

U.S. PATENT DOCUMENTS

| | | | |
|---|---|---|---|
| 4,421,167 A | 12/1983 | Erbstoesser et al. | |
| 4,488,599 A | 12/1984 | Graham et al. | |
| 4,802,144 A | 1/1989 | Holzhausen et al. | |
| 7,302,849 B2 | 12/2007 | Segal et al. | |
| 8,066,068 B2 * | 11/2011 | Lesko et al. | 166/280.2 |
| 2002/0007949 A1 | 1/2002 | Tolman et al. | |
| 2003/0196809 A1 * | 10/2003 | Willberg et al. | 166/300 |
| 2005/0274523 A1 | 12/2005 | Brannon et al. | |
| 2006/0113077 A1 | 6/2006 | Willberg et al. | |

(Continued)

FOREIGN PATENT DOCUMENTS

| | | |
|---|---|---|
| WO | 2006014951 A2 | 2/2006 |
| WO | 2013085412 A1 | 6/2013 |
| WO | 2013112811 A1 | 8/2013 |

OTHER PUBLICATIONS

Smith, John E., "Effect of incomplete fracture fill up at the wellbore on productivity ratio", SPE 4677—48th Fall Meeting of the Society of Petroleum Engineers of AIM, Las Vegas, Nevada, 1973, pp. 1-16.

(Continued)

*Primary Examiner* — Zakiya W Bates
*Assistant Examiner* — Silvana Runyan

(57) ABSTRACT

A method of treating a subterranean formation comprising generating a fracture in the subterranean formation, introducing a predetermined amount of proppant into a treatment fluid, and subsequently introducing a plugging agent into the treatment fluid before the entire predetermined amount of proppant reaches the fracture, minimizing overdisplacement of the proppant from the fracture.

11 Claims, 2 Drawing Sheets

(56) References Cited

U.S. PATENT DOCUMENTS

| | | |
|---|---|---|
| 2008/0066909 A1 | 3/2008 | Hutchins et al. |
| 2008/0093073 A1 | 4/2008 | Bustos et al. |
| 2010/0089580 A1* | 4/2010 | Brannon ............... C09K 8/602 166/280.2 |
| 2011/0028328 A1 | 2/2011 | Selvamanickam et al. |
| 2012/0181034 A1 | 7/2012 | Bour et al. |
| 2012/0285692 A1 | 11/2012 | Potapenko et al. |
| 2013/0233545 A1 | 9/2013 | Mahoney et al. |

OTHER PUBLICATIONS

U.S. Appl. No. 14/103,203, filed Dec. 11, 2013; 29 pages.
U.S. Appl. No. 61/914,073, filed Dec. 10, 2013; 23 pages.
First Examination Report issued in related AU application 2014262292 on Aug. 21, 2015, 5 pages.

* cited by examiner

METHODS FOR MINIMIZING OVERDISPLACEMENT OF PROPPANT IN FRACTURE TREATMENTS

BACKGROUND

Hydrocarbons, such as oil, condensate and gas, are often produced from wells that are drilled into the formations containing them. Oftentimes, the flow of hydrocarbons into the well may be low, at least because of inherently low permeability of the reservoirs or damage to the formation caused by the drilling and completion of the well. To allow for desirable hydrocarbon flow, various treatments, such as hydraulic fracturing or acid fracturing may be performed.

Hydraulic fracturing involves injecting treatment fluids into a formation at high pressures and rates such that the reservoir formation fails and forms a fracture (or fracture network). Proppants may be injected in treatment fluids after the pad to hold the fracture(s) open after the pressures are released. Hydraulic fracturing (and acid fracturing) of horizontal wells and multi-layered formations often involve using diverting techniques in order to enable fracturing redirection between different zones.

Diversion methods using particulates may be based on bridging of particles of the diverting material behind casing and forming a plug by accumulating the rest of the particles at the formed bridge. In these treatments, when an induced fracture is open, there includes a risk that solid particles used for diverting will not actually bridge over the fracture. Instead, such particles may be displaced from areas near the wellbore where high conductivity is desired and ultimately lost within the fracture (overdisplacement).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The statements made merely provide information relating to the present disclosure, and may describe some embodiments illustrating the subject matter of this application.

In a first aspect, a method for treating a subterranean formation penetrated by a wellbore is disclosed. The method includes generating a fracture in the subterranean formation. The method also includes injecting a treatment fluid into the wellbore at a fluid pressure equal to or greater than a fracture initiation pressure of the subterranean formation, such that the treatment fluid is used to transport a predetermined amount of a proppant into the wellbore. The method further includes forming a plug in the fracture by introducing a plugging agent into the treatment fluid before the entire predetermined amount of proppant reaches the fracture without lowering the fluid pressure.

In a second aspect, a method of minimizing overdisplacement of a proppant from a subterranean formation penetrated by a wellbore is disclosed. The method includes introducing a slurry including an amount of proppant into a fracture formed in the subterranean formation and forming a plug by introducing a plugging agent into the slurry simultaneously with or after a last percentage of the proppant without lowering a fluid pressure being used to introduce the amount of proppant into the fracture.

BRIEF DESCRIPTION OF THE DRAWINGS

The manner in which the objectives of the present disclosure and other desirable characteristics may be obtained is explained in the following description and attached drawings in which.

DETAILED DESCRIPTION

Figure 1:
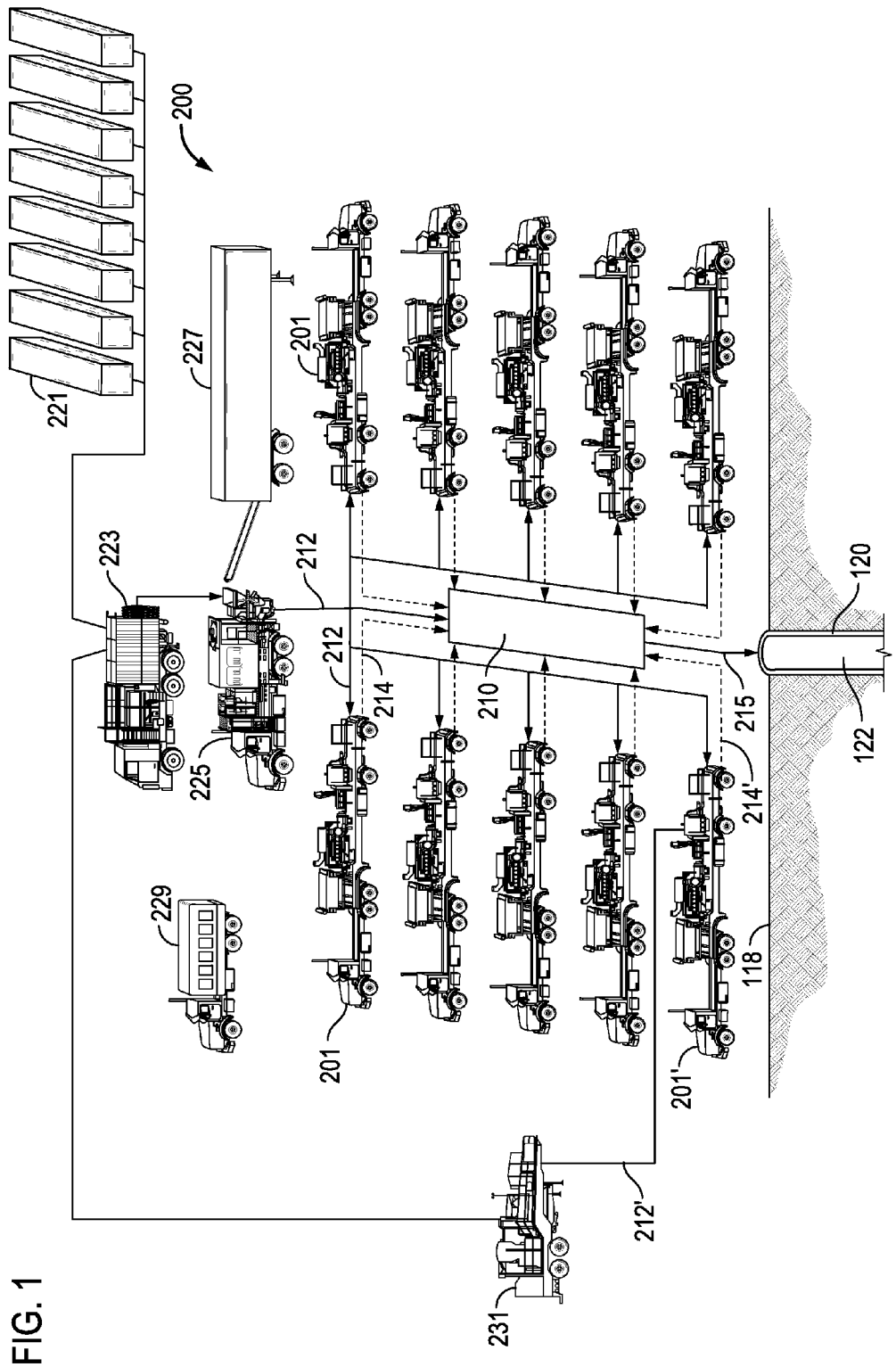
FIG. 1 is a schematic representation of a pump system for performing a hydraulic fracturing operation on a well according to one or more embodiments described herein.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if a specific data points within the range, or even no data points within the range, are explicitly identified or refer to a few specific, it is to be understood that inventors appreciate and understand that any conceivable data point within the range is to be considered to have been specified, and that inventors possessed knowledge of the entire range and each conceivable point and sub-range within the range.

The following definitions are provided in order to aid those skilled in the art in understanding the detailed description.

When hydraulic fracturing is applied in hydrocarbon reservoirs to increase the production rate of hydrocarbons from the reservoir, the primary objective of the well treatment is to increase the production surface area of the formation. Between this increased surface area and the production well, a flow path of higher conductivity than the formation has to be situated. To increase the surface area, high pressure is used, which fractures the rock. In the methods of the present disclosure, a high conductivity path is created by minimizing overdisplacement of the proppant by generating a fracture in the subterranean formation, introducing a predetermined amount of proppant into a treatment fluid, and subsequently introducing a plugging agent into the treatment fluid before the entire predetermined amount of proppant reaches the fracture.

The methods of the present disclosure may be used to treat at least a portion of a subterranean formation. The term "treat," "treatment," or "treating," does not imply any particular action by the fluid. For example, a treatment fluid placed or introduced into a subterranean formation may be, for example, a hydraulic fracturing fluid, an acidizing fluid (acid fracturing, acid diverting fluid), a stimulation fluid, a sand control fluid, a completion fluid, a wellbore consolidation fluid, a remediation treatment fluid, a cementing fluid, a driller fluid, a frac-packing fluid, or gravel packing fluid.

As used herein, the term "treatment fluid," refers to any known pumpable and/or flowable fluid used in a subterranean operation in conjunction with a desired function and/or for a desired purpose. As used herein, a "pill" or a "plug fluid" is a type of relatively small volume of specially prepared treatment fluid placed or circulated in the wellbore.

The term "subterranean formation" refers to any physical formation that lies at least partially under the surface of the earth.

The term "fracturing" refers to the process and methods of breaking down a geological formation and creating a fracture, such as the rock formation around a wellbore, by pumping a treatment fluid at very high pressures (pressure above the determined closure pressure of the formation), in order to increase production rates from or injection rates into a hydrocarbon reservoir. The fracturing methods of the present disclosure may include forming a plug in the fracture by introducing a plugging agent into the treatment fluid before the entire predetermined amount of proppant reaches the fracture without lowering the fluid pressure, but otherwise use conventional components and techniques known in the art.

The term "particulate" or "particle" refers to a solid 3D object with maximal dimension less than about 20 mm, such as less than about 15 mm. Further, the term "particulate" or "particle" as used herein includes ball sealers. Here "dimension" of the object refers to the distance between two arbitrary parallel planes, each plane touching the surface of the object at least one point. The maximal dimension refers to the biggest distance existing for the object between any two parallel planes and the minimal dimension refers to the smallest distance existing for the object between any two parallel planes. In some embodiments, the particulates used possess a ratio between the maximal and the minimal dimensions (particle aspect ratio maximum/minimum) that is 5 or below, such as 3 or below, or in a range of from about 0.01 to about 5, such as in a range of from about 0.2 to about 4. Suitable particles for use in the methods of the present disclosure include any known particle suitable for a fracturing operation, such as those described in, for example, U.S. Patent Application Publication No. 2012/0285692, the disclosure of which is incorporated by reference herein in its entirety.

A "wellbore" may be any type of well, including, a producing well, a non-producing well, an injection well, a fluid disposal well, an experimental well, an exploratory deep well, and the like. Wellbores may be vertical, horizontal, deviated some angle between vertical and horizontal, and combinations thereof, for example a vertical well with a non-vertical component.

The term "real-time" refers to the actual time during which a process or event occurs. Real time monitoring of data refers to live monitoring of data, for example data relating to the size or orientation of a fracture, that may allow for an action, for example a plugging application, to be taken based upon the monitoring. Suitable techniques, sensors, and methodology for monitoring data in subterranean formations are discussed in, for example, U.S. Pat. Nos. 7,302,849, and 4,802,144, the disclosures of which are incorporated by reference herein in their entireties.

The methods of the present disclosure may be employed in any desired downhole application (such as, for example, hydraulic fracturing and/or stimulation) at any time in the life cycle of a reservoir, field or oilfield. The term "field" includes land-based (surface and sub-surface) and sub-seabed applications. The term "oilfield," as used herein, includes hydrocarbon oil and gas reservoirs, and formations or portions of formations where hydrocarbon oil and gas are expected but may additionally contain other materials such as water, brine, or some other composition.

The term "flake" refers to special type of particulate as defined above. The flake is a solid 3D object having a thickness smaller than its other dimensions, for example its length and width.

For the purposes of the disclosure, particles and flakes may have homogeneous structure or may also be non-homogeneous such as porous or made of composite materials.

The term "particle size", "particulate size" or "flake size" refers to the diameter of the smallest imaginary circumscribed sphere which includes such particulate or flake.

The term "overdisplacement" refers to the movement of proppant away from a region of the fracture near the wellbore where high conductivity is desired to a region deeper in the fracture, where it does no longer provide support to keep the fracture walls sufficiently separated from each other. Overdisplacement therefore leads to a partial loss of conductivity in the near-wellbore region by inducing a choke at the fracture entrance or in the worst case, by inducing a pinch point where the fracture walls come in direct contact with each other. The amount of acceptable overdisplacement is therefore a function of the geomechanical properties of the rock (young modulus, Poisson ratio, Yield stress) such that the rock stiffness is sufficient for the fracture to remain open in the unpropped area when subjected to stress.

The term "bridging" refers to intentionally or accidentally plugging off pore spaces or fluid paths in a rock formation, or to make a restriction in a wellbore or annulus. A bridge may be partial or total, and can be caused by solids (drilled solids, cuttings, cavings or junk) becoming lodged together in a narrow spot or geometry change in the wellbore.

The term "wellbore" refers to a drilled hole or borehole, including the surface opening or uncased portion of the well.

The term "plug" refers to a structure that blocks of permeable zones to prevent loss of a fluid into those permeable zones or to protect those zones from damage. The term "removable plug" refers to a temporary plug in a fracture. The removable plug may be made of a degradable material or a dissolvable material, such that the plug at least partially degrades, deteriorates, dissolves, and/or disappears over a period of time. For example, about 20% to 100% of the plug may disappear, such as about 40% to about 80% of the plug may degrades, deteriorates, dissolves, and/or disappears over time. In some embodiments, the removable plug may be made from a non-degradable material that is later removed by mechanical or other means.

While the embodiments described herewith refer to well treatment it is equally applicable to any well operations where zonal isolation is desired, such as drilling operations, workover operations, and the like. In some embodiments, the methods of the present disclosure may comprise performing a diversion treatment with solid particulates once it is determined that the downhole fracture features are narrow, so as to minimize the possibility of losing particulates within large, wide open fractures. In some embodiments, the methods of the present disclosure may comprise estimating changes and/or calculating changes in fracture geometry by monitoring data from one or more sensors while the fracture is open, performing a shut-in by stopping injection of the treatment fluid and introducing a plugging agent, include performing a fracturing operation by introducing a treatment fluid into the wellbore at a fluid pressure equal to or greater than a fracture initiation pressure of the subterranean formation to induce a fracture in the subterranean formation. Such methods are described in "Method of Treating a Subterranean Formation," to Bruno Lecerf et al. (concurrently filed herewith) the disclosure of which is incorporated by reference herein in its entirety.

In some embodiments, one or more treatment operations may be performed to treat a subterranean formation. The one or more treatment operations may include a series of hydraulic fracturing operations, which may include fracturing a portion of the subterranean forming by providing sufficient hydraulic pressure, and/or fracturing one or more isolated portions of the subterranean forming by providing a sufficient hydraulic pressure. Other treatment operations, such as acidizing a formation to generate a fracture, may also be used. In some embodiments, various components and methodology from known diverting methods may be used in the methods of the present disclosure. For example, the methods of the present disclosure may include the use of mechanical isolation devices such as packers and well bore plugs, setting bridge plugs, pumping ball sealers, and pumping slurred benzoic acid flakes and removable and/or degradable particulates, such as those described in U.S. Patent Application Publication No. 2002/0007949, the disclosure of which is incorporated by reference herein in its entirety.

In a hydraulic fracturing operation, a treatment fluid, which may include a predetermined amount of proppant, may be injected into a wellbore at a fluid pressure equal to or greater than a fracture initiation pressure of the subterranean formation. The fluid pressure is the rate (volume/time) at which a fluid is pumped. The term "fracture initiation pressure" refers to the fluid pressure sufficient to induce a fracture in a subterranean formation.

Fracturing a subterranean formation may include introducing hundreds of thousands of gallons of fracturing fluid into the wellbore. In some embodiments a frac pump may be used for hydraulic fracturing. A frac pump is a high-pressure, high-volume pump, such as a positive-displacement reciprocating pump. In embodiments, a treatment fluid may be introduced by using a frac pump, such that the fracturing fluid may be pumped down into the wellbore at high rates and pressures, for example, at a flow rate in excess of about 20 barrels per minute (BPM) (about 4,200 U.S. gallons per minute) at a pressure in excess of about 2,500 pounds per square inch ("psi"). In some embodiments, the pump rate and pressure of the fracturing fluid may be even higher, for example, at flow rates in excess of about 100 BPM and pressures in excess of about 10,000 psi may be used.

FIG. 1 shows a suitable pump system 200 that may be used in the methods of the present disclosure for pumping a treatment fluid from a surface 118 of a well 120 to a wellbore 122 during an oilfield operation. For example, in some embodiments, the treatment operation may be a hydraulic fracturing operation, and the treatment fluid pumped is a fracturing fluid. As shown in FIG. 1, the pump system 200 includes a plurality of water tanks 221, which feed water to a gel maker 223. The gel maker 223 combines water from the tanks 221 with a gelling agent to form a gel. The gel is then sent to a blender 225 where it is mixed with a proppant from a proppant feeder 227 to form a fracturing fluid. The gelling agent increases the viscosity of the fracturing fluid and may assist in the suspension of the proppant in the fracturing fluid.

The fracturing fluid may then be pumped at any desirable pressure (for example, a pressure of from about 10 psi to about 200 psi, such as a pressure of from about 20 psi to about 100 psi, or a pressure of from about 40 psi to about 80 psi) from the blender 225 to a plurality of plunger pumps 201 as shown by solid lines 212. If desired, each plunger pump 201 in the embodiment of FIG. 1 may have the same or a similar configuration. In some embodiments, multistage centrifugal pumps may be used instead of plunger pumps. As shown in FIG. 1, each plunger pump 201 may receive the fracturing fluid at a suitable pressure (for example, a pressure of from about 10 psi to about 200 psi, such as a pressure of from about 20 psi to about 100 psi, or a pressure of from about 40 psi to about 80 psi) and discharge it to a common manifold 210 (also referred to as a "missile trailer" or "missile") at a high pressure (for example, a pressure of from about 1000 psi to about 30,000 psi, such as a pressure of from about 3,000 psi to about 20,000 psi, or a pressure of from about 5,000 psi to about 10,000 psi) as shown by dashed lines 214. The missile 210 then directs the fracturing fluid from the plunger pumps 201 to the wellbore 122 as shown by solid line 215.

In some embodiments, an estimate of the well pressure and the flow rate desired to create the fractures in the wellbore may be calculated and/or estimated by known techniques, devices, sensors and methodology, such as that described in "Reservoir Stimulation Third Edition," to Michael J. Economides and Kenneth G. Nolte, published by Wiley in 2000. Based on known calculation and/or estimation methodology, the amount of hydraulic horsepower use by the pumping system in order to carry out the fracturing operation may be determined. For example, if it is estimated that the well pressure and a suitable flow rate are 6000 psi (pounds per square inch) and 68 Barrels Per Minute (BPM), respectively, then the pump system 200 would have to supply 10,000 hydraulic horsepower to the fracturing fluid (i.e., 6000*68/40.8).

In some embodiments, the prime mover in each plunger pump 201 may be an engine with a maximum rating of 2250 brake horsepower, which, when accounting for losses (about 3% for plunger pumps in hydraulic fracturing operations), allows each such plunger pump 201 to supply a maximum of about 2182 hydraulic horsepower to the fracturing fluid. Therefore, in order to supply 10,000 hydraulic horsepower to a fracturing fluid, the pump system 200 of FIG. 1 would use at least five plunger pumps 201.

In order to prevent an overload of the transmission, between the engine and the fluid end of each plunger pump 201, each plunger pump 201 may be operated well under is maximum operating capacity. Operating the pumps under their operating capacity also allows for manipulating the speeds of each of such pumps to be run at a higher speed and/or lower speed in order to maintain a substantially constant pumping rate during a period (for example, during a period of from about 60 seconds to about 300 minutes) in which a volume of a second fluid (such as, for example, a second fluid comprising a plugging agent) is introduced into the treatment fluid being pumped downhole. In some embodiments, the speeds of the pumps may be adjusted such that the rate at which the treatment fluid is being introduced does not fluctuate more than ±5% of its initial calculated value (for example, ±3.4 BPM for the above-identified conditions in which the flow rate is 68 BPM) at which the treatment fluid is introduced into the wellbore, or the speeds of the pumps may be adjusted such that the rate at which the treatment fluid is being introduced does not fluctuate more than ±1% of its initial calculated value at which the treatment fluid is introduced into the wellbore. In some embodiments, a computerized control system may be employed to direct and/or adjust the entire pump system as desired for the duration of the fracturing operation.

In some embodiments, in a fracturing operation where 10,000 hydraulic horsepower is suitable, and, for example, ten plunger pumps 201 may be used at the well site, each pump engine may be operated at about 1030 brake horsepower (about half of its maximum) in order to supply 1000 hydraulic horsepower individually and 10,000 hydraulic horsepower collectively to the fracturing fluid. In such embodiments, for example, if nine of the pumps 201 are used to supply hydraulic horsepower to the fracturing fluid (and as discussed below, one of the pumps was dedicated to supplying a second highly loaded plugging agent fluid, such as high solid content fluid), then each of the nine pump engines may be operated at about 1145 brake horsepower in order to supply the 10,000 hydraulic horsepower to the fracturing fluid, that is, until to the addition of the second highly loaded plugging agent fluid (such as high solid content fluid) is initiated; and then each pump engine (that is, ten total pumps) may be operated at about 1030 brake horsepower (about half of its maximum) in order to supply 1000 hydraulic horsepower individually and 10,000 hydraulic horsepower collectively to the treatment fluid (which would comprise a plug of the second highly loaded plugging agent fluid, such as high solid content fluid). As shown in FIG. 1, a computerized control system 229 may be employed to direct and/or adjust the entire pump system 200 for the duration of the fracturing operation.

As suggested above, in some embodiments, the fluid that is pumped from the well surface 118 to the wellbore 122 may comprise a first fluid containing the treatment fluid (as described above) that is pumped by one or more first fluid pumps 201, and second fluid containing a plugging agent in a fluid carrier that is pumped by one or more second fluid pumps 201'. For example, in a fracturing operation the second fluid pumps 201' may be used to supply a plugging agent in a fluid carrier. In some embodiments, each first fluid pump 201 and each second fluid pump 201' may have the same or a similar configuration.

In some embodiments, the second fluid pumps 201' may receive a high loading stream including a plugging agent (such as high solid content fluid), as discussed below. For example, in some embodiments, the pump system 200 includes a plurality of water tanks 221, which feed water to a gel maker 223. The gel maker 223 combines water from the tanks 221 with a gelling agent and forms a gel, which is sent to a cement mixing/bender float 231 where it is mixed with a plugging agent to form a second fluid, in this case a second fluid comprising a predetermined amount of plugging agent.

In some embodiments, the second fluid may then be pumped at suitable pressure (for example, a pressure of from about 10 psi to about 200 psi, such as a pressure of from about 20 psi to about 100 psi, or a pressure of from about 40 psi to about 80 psi) from the cement mixing/bender float 231 to the second fluid pumps 201' as shown by solid lines 212', and discharged by the second fluid pump 201' at a high pressure (for example, a pressure of from about 1000 psi to about 30,000 psi, such as a pressure of from about 3,000 psi to about 20,000 psi, or a pressure of from about 5,000 psi to about 10,000 psi) to a common manifold or missile 210 as shown by dashed lines 214'.

In such embodiments, the treatment fluid supplied to the first fluid pumps may be supplied from a plurality of water tanks 221, which feed water to a gel maker 223. The gel maker 223 combines water from the tanks 221 with a gelling agent to form a gel. The gel is then sent to a blender 225 where it is mixed with a proppant from a proppant feeder 227 to form a fracturing fluid. After a predetermined amount of proppant (for example, a proppant amount effective to prop the fracture of interest) has been delivered into the wellbore, water from the water tanks 221 and/or a treatment fluid in which the proppant is not present may be pumped at suitable pressure (for example, a pressure of from about 10 psi to about 200 psi, such as a pressure of from about 20 psi to about 100 psi, or a pressure of from about 40 psi to about 80 psi) directly to the first fluid pumps 201, such as by a transfer pump, and discharged at a high pressure to the missile 210 as shown by dashed lines 214. The missile 210 receives both the first and second fluids and directs their combination to the wellbore as shown by solid line 215.

In embodiments, the pump system 200 shown in FIG. 1 may be used to pump the plugging agent simultaneously with, or immediately after the proppant, such that the plugging agent can be added into the surface line without having to lower the pump rate. For example, in some embodiments, the rate at which the treatment fluid is being introduced may not fluctuate more than ±5% of its initial value during the time (for example, during a period of time of from about 10 seconds to about 10 minutes) in which the plugging agent is added into the surface line, or the rate at which the treatment fluid is being introduced may not fluctuate more than ±1% of its initial value during the time (for example, during a period of time of from about 20 seconds to about 5 minutes) in which the plugging agent is added into the surface line. In some embodiments, the plugging agent may also be introduced into the wellbore at a rate in the range of from about 20 to about 120 BPM, such as from about 40 to about 80 BPM, or at a rate of from about 50 to about 60 BPM.

Under the above-described conditions in which 10 fluid pumps (9 first fluid pumps and 1 second fluid pump) are employed for supplying treatment fluid to a well 120 in which a 10,000 hydraulic horsepower is suitable, and assuming that each of the nine first fluid pumps 201 and one second fluid pump 201' contains an engine with a maximum rating of 2250 brake horsepower, each pump engine in each first fluid pump and each second fluid pump 201/201' could be operated at about 1030 brake horsepower at the time the second fluid is introduced into the fluid system in order to supply the 10,000 hydraulic horsepower to the fracturing fluid during the time in which the plugging agent is added into the surface line (each of the nine pump engines may be operated at about 1145 brake horsepower (before and after period of the time in which the plugging agent is added into the surface line) in order to supply the 10,000 hydraulic horsepower to the fracturing fluid).

In some embodiments, the number of total number of pumps 201 in the pump system 200 of FIG. 1 may be reduced if the pump engines are run at a higher brake horsepower. In addition, a computerized control system 229 may be employed to direct and/or adjust the entire pump system 200 for the duration of the fracturing operation.

Although the pump system 200 of FIG. 1 was described with respect to a well 120 in which 10,000 kW hydraulic horsepower is suitable, it is to be understood that the pump systems that may be used in the method of the present disclosure may supply any desired amount of hydraulic horsepower to a well. For example, various wells may have hydraulic horsepower requirements in the range of about 1,000 kW hydraulic horsepower to about 25,000 kW hydraulic horsepower, or in the range of about 2,000 kW hydraulic horsepower to about 15,000 kW hydraulic horsepower.

Although FIG. 1 shows the pump system 200 as having eight first fluid pumps 201 and one second fluid pump 201', in some embodiments the pump system may contain any appropriate number of first fluid pumps, and any appropriate number of second fluid pumps 201 (such as, for example, in embodiments where a sequence of slurries are being pumped), dependent on the hydraulic horsepower used to perform the desired operation in the well 120, the percent capacity at which it is desired to run the pump engines, and the amount of each fluid (for example, the volume of the plug relative to the amount of treatment fluid, such as a fracturing fluid) desired to be pumped.

In some embodiments, the operation may include a fracturing operation in which to a sequence of slurries having the same or different component (for example, a plugging agent) concentrations being pumped into the wellbore. Such slurries may be pumped at a rate of from about 20 to about 120 BPM, such as from about 40 to about 80 BPM, or at about 60 BPM.

Figure 2:
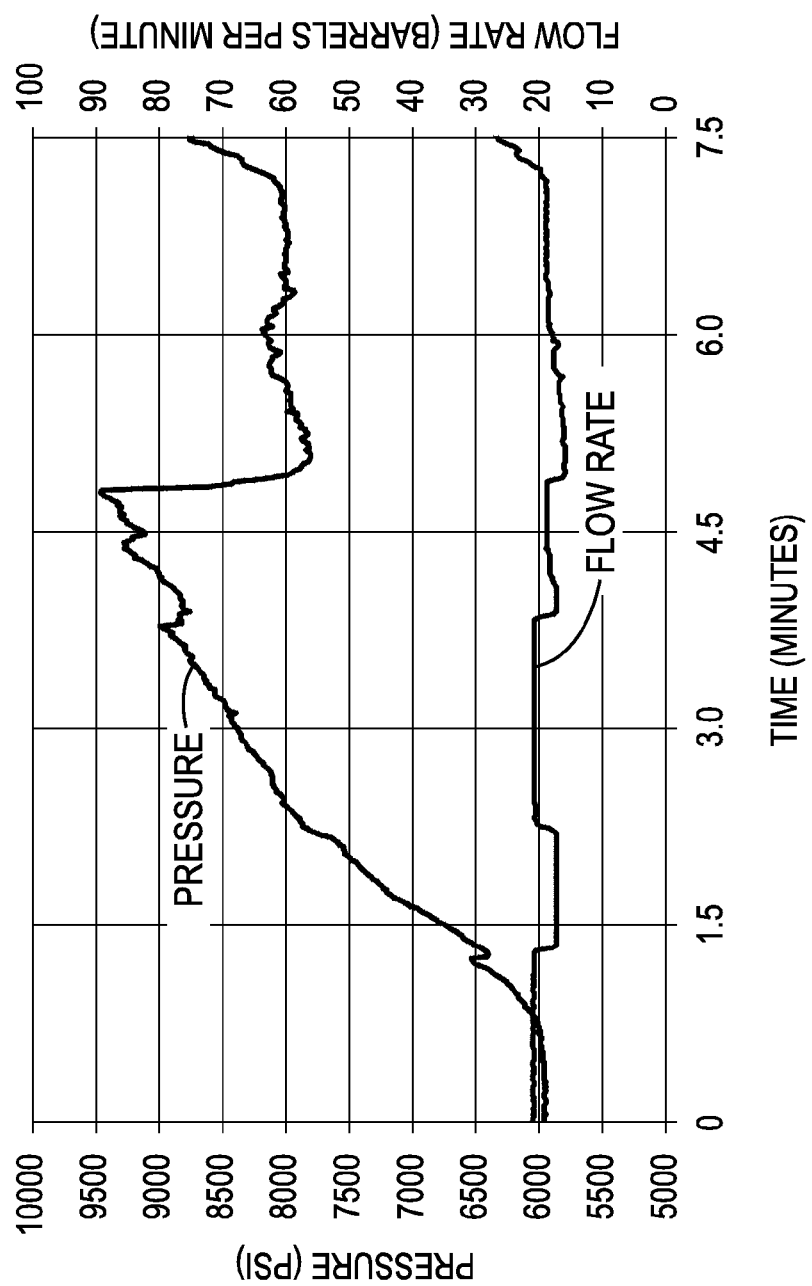
FIG. 2 shows a graphical representation of a surface pressure plot according to one or more embodiments described herein.

In some embodiments, events occurring downhole may be monitored while the treatment fluid is being injected, such as while a treatment fluid comprising a plugging agent is being introduced into a wellbore to plug a fracture (such introduction occurring without substantially lowering the fluid pressure). For example, such monitoring of events may include acquiring and recording data, such as, for example, the data shown in FIG. 2 (a further description of FIG. 2 is provided below in the EXAMPLES sections), which illustrates pressure data acquired and recorded when the plugging agent reaches a sandface. A gain in treatment pressure may provide evidence that some perforations are plugged. Additionally, when a sudden drop in pressure occurs, this may indicate that perforations that were left un-stimulated during the fracturing stage are now open and ready to take on the displacing fluid, while the perforations where the proppant had been previously placed are plugged by the plugging agent.

In some embodiments, the plugging agent may be introduced before the entire predetermined amount of proppant reaches the fracture. For example, the plugging agent may be introduced into the treatment fluid simultaneously with a last percentage of the proppant, such as with the last 1 wt % of the predetermined amount of proppant that is introduced into the wellbore. In some embodiments, the plugging agent may be introduced into the treatment fluid just after the entire amount of proppant has been introduced into the wellbore, but before the entire predetermined amount of proppant reaches the fracture. For example, the plugging agent may be introduced into the treatment fluid at a time that is in a range of from about 2 seconds to about 180 seconds after the entire predetermined amount of proppant has been injected into the wellbore, such as from about 10 seconds to about 60 seconds after the entire predetermined amount of proppant has been injected into the wellbore.

In some embodiments, the plugging agent may be introduced after the entire predetermined amount of the proppant is introduced into the wellbore, but before the entire predetermined amount of proppant reaches the fracture, such that a volume of a "spacer" between a tail end of the proppant and a leading edge of the plugging agent is less than a volume of the wellbore between a surface opening of the wellbore and the fracture to be plugged. The term "spacer" refers to the volume of treatment fluid between a tail end of the proppant, that is, the last portion of the treatment fluid that contains proppant, and a leading edge of the plugging agent, that is, the first portion of the treatment fluid that contains the plugging agent.

For example, the volume of spacer between a tail end of the proppant and a leading edge of the plugging agent may be about 2% to about 90% of the volume of the wellbore between the surface opening and the fracture to be plugged, such as from about 5% to 40% of the volume of the wellbore between the surface opening and the fracture to be plugged.

The plugging agent may form a removable plug in the fracture to prevent overdisplacement of the proppant that has entered the fracture. The amount of overdisplacement is then capped by the volume of spacer and diverter fluid stages pumped after the proppant. Acceptable level of overdisplacement may be estimated by theoretical calculations which include the rock geomechanical properties, stress ad desired conductivity in the near wellbore region. It can also be inferred from a sensitivity study on wells where various amount of overdisplacing fluids have been used and where conductivity of the near wellbore fracture can be estimated from production results. For example, the method may prevent about 90% by weight or more (such as about 95% by weight or more, or about 99% by weight or more) of the proppant from being overdisplaced from a fracture in the near wellbore region (such as preventing about 90% by weight or more (such as about 95% by weight or more, or about 99% by weight or more) of the proppant from being displaced to a distance that is more than about 10 feet from the wellbore, or to a distance that is more than about 20 feet from the wellbore, or to a distance that is more than about 50 feet from the wellbore, or to a distance that is more than about 100 feet from the wellbore.

In embodiments, the methods of the present disclosure may further include performing a known downhole operation after the plug is formed, such as a further a hydraulic fracturing operation, an acidizing operation, a stimulation operation, a sand control operation, a completion operation, a wellbore consolidation operation, a remediation treatment operation, a cementing operation, a frac-packing fluid operation, and/or or gravel packing operation.

In embodiments, the methods of the present disclosure may also include allowing the plug to at least partially degrade or be removed after a predetermined period of time.

In embodiments, the methods of the present disclosure may further include placing a bridge plug or sand plug in the wellbore and subsequently fracturing an additional layer or layers. The bridge plug may be placed in the wellbore between the surface opening of the wellbore and the previously formed fracture. In other words, a bridge plug method includes fracturing a subterranean formation and then setting a bridge plug, and repeating this process as desired. Using a bridge plug ensures zone isolation by setting a packer between fractured and targeted zones. A sand plug method is similar to the bridge plug method, except that sand plugs are used instead of mechanical plugs.

In some embodiments, the methods of the present disclosure may include fracturing a subsequent layer or layers without placing a bridge plug or a sand plug.

Treatment Fluids

As discussed above, the treatment fluid suitable for use in the methods of the present disclosure (including those embodiments that include a further downhole operation) may be any well treatment fluid, such as a hydraulic fracturing fluid, an acidizing fluid (acid fracturing, acid diverting fluid), a stimulation fluid, a sand control fluid, a completion fluid, a wellbore consolidation fluid, a remediation treatment fluid, a cementing fluid, a driller fluid, a frac-packing fluid, or gravel packing fluid. The solvent (for example, carrier fluid or carrier solvent) for the treatment fluid may be a pure solvent or a mixture. Suitable solvents or use with the methods of the present disclosure, such as for forming the treatment fluids disclosed herein, may be aqueous or organic based. Aqueous solvents may include at least one of fresh water, sea water, brine, mixtures of water and water-soluble organic compounds and mixtures thereof. Organic solvents may include any organic solvent that is able to dissolve or suspend the various other components of the treatment fluid.

In some embodiments, the treatment fluid may have any suitable viscosity, such as a viscosity of from about 1 cP to about 1,000 cP (or from about 10 cP to about 100 cP) at the treating temperature, which may range from a surface temperature to a bottom-hole static (reservoir) temperature, such as from about −40° C. to about 150° C., or from about 10° C. to about 120° C., or from about 25° C. to about 100° C.

While the treatment fluids of the present disclosure are described herein as comprising the above-mentioned components, it should be understood that the treatment fluids of the present disclosure may optionally comprise other chemically different materials. In embodiments, the treatment fluid may further comprise stabilizing agents, surfactants, diverting agents, or other additives. Additionally, a treatment fluid may comprise a mixture of various crosslinking agents, and/or other additives, such as fibers or fillers, provided that the other components chosen for the mixture are compatible with the intended use of the treatment fluid. Furthermore, the treatment fluid may comprise buffers, pH control agents, and various other additives added to promote the stability or the functionality of the treatment fluid. The components of the treatment fluid may be selected such that they may or may not react with the subterranean formation that is to be treated.

In this regard, the treatment fluid may include components independently selected from any solids, liquids, gases, and combinations thereof, such as slurries, gas-saturated or non-gas-saturated liquids, mixtures of two or more miscible or immiscible liquids, and the like. For example, the treatment fluid may comprise organic chemicals, inorganic chemicals, and any combinations thereof. Organic chemicals may be monomeric, oligomeric, polymeric, crosslinked, and combinations, while polymers may be thermoplastic, thermosetting, moisture setting, elastomeric, and the like. Inorganic chemicals may be inorganic acids and inorganic bases, metals, metallic ions, alkaline and alkaline earth chemicals, minerals, salts and the like.

Various fibrous materials may be included in the treatment fluid. Suitable fibrous materials may be woven or nonwoven, and may be comprised of organic fibers, inorganic fibers, mixtures thereof and combinations thereof.

In embodiments, the treatment fluid may be driven into a wellbore by a pumping system that pumps one or more treatment fluids into the wellbore. As discussed above, the pumping systems may include mixing or combining devices, wherein various components, such as fluids, solids, and/or gases maybe mixed or combined prior to being pumped into the wellbore. The mixing or combining device may be controlled in a number of ways, including, for example, using data obtained either downhole from the wellbore, surface data, or some combination thereof.

Any desired particulate material may be used in the methods of the present disclosure. For example, particulate materials may include sized sand, synthetic inorganic proppants, coated proppants, uncoated proppants, resin coated proppants, and resin coated sand.

In embodiments where the particulate material is a proppant, the proppant used in the methods of the present disclosure may be any appropriate size to prop open the fracture and allow fluid to flow through the proppant pack, that is, in between and around the proppant making up the pack. In some embodiments, the proppant may be selected based on desired characteristics, such as size range, crush strength, and insolubility. In embodiments, the proppant may have a sufficient compressive or crush resistance to prop the fracture open without being deformed or crushed by the closure stress of the fracture in the subterranean formation. In embodiments, the proppant may not dissolve in treatment fluids commonly encountered in a well.

Any proppant may be used, provided that it is compatible with the formation, the treatment fluid, and the desired results of the treatment operation. Such proppants may be natural or synthetic (including silicon dioxide, sand, nut hulls, walnut shells, bauxites, sintered bauxites, glass, natural materials, plastic beads, particulate metals, drill cuttings, ceramic materials, and any combination thereof), coated, or contain chemicals; more than one proppant may be used sequentially or in mixtures of different sizes or different materials. The proppant may be resin coated, provided that the resin and any other chemicals in the coating are compatible with the other chemicals of the present disclosure, such as the thermally shrinkable and/or shrunken fibers of the present disclosure.

The proppant used may have any desired particle size, such as an average particle size of from about 0.15 mm to about 2.39 mm (about 8 to about 100 U.S. mesh), or of from about 0.25 to about 0.43 mm (40/60 mesh), or of from about 0.43 to about 0.84 mm (20/40 mesh), or of from about 0.84 to about 1.19 mm (16/20), or of from about 0.84 to about 1.68 mm (12/20 mesh) and or of from about 0.84 to about 2.39 mm (8/20 mesh) sized materials. The proppant may be present in a slurry (which may be added to the treatment fluid) in any desired concentration, such as a concentration of from about 0.12 to about 3 kg/L, or about 0.12 to about 1.44 kg/L (about 1 PPA to about 25 PPA, or from about 1 to about 12 PPA; PPA is "pounds proppant added" per gallon of liquid).

Plugging Agents

Suitable plugging agents for use in the above-described methods include those capable of forming a plug in a subterranean fracture. The plugging agent is a material that is capable of plugging in the proximity of the fracture to prevent further fluid from penetrating and sweeping the proppant deeper into the fracture. The plugging agent may plug a fracture by, for example, bridging with the proppants in the fracture. Suitable plugging agents include those that are capable of forming removable plugs, such as degradable plugs or dissolvable plugs. Degradable plugs are plugs made of degradable materials that are capable of completely or at least partially degrading. Dissolvable plugs are plugs made of dissolvable materials that are capable of completely or at least partially dissolving. For example, a suitable plugging agent may be a high solid content fluid, a ball sealer, such as a degradable ball sealers, that is, a bioball, or a carrier fluid and a plugging agent. Examples of suitable plugging agents include degradable materials, meltable materials, dissolvable materials, and non-degradable materials.

As described in WO 2013085412, the disclosure of which is incorporated by reference herein in its entirety, using a high solid content fluid may include includes using a slurry containing a multi-modal mixture of solid particles for plugging the wellbore fracture, or formation zones, during multi-stage fracturing. The pumpable or flowable, and mobile, slurry is called a high solid content fluid or High Solids Content Fluid (HSCF). In some embodiments, the above-mentioned second fluid comprising the plugging agent may be an HSCF fluid in which either (i) the volume of the continuous liquid phase of the slurry is reduced (dehydration) such that the solid volume exceeds the packed volume fraction, or (ii) the viscosity of the continuous liquid phase of the slurry is increased to the point at which the slurry does not flow under the applied fluid pressure. In some embodiments, either action may be suitable cause the formation of a mechanically stable plug. Such a plug may be chemically removable or permanent.

In some embodiments, a carrier fluid for the plugging agent, may comprise, for example, water, such as fresh water or sea water; hydratable gels, such as guars, polysaccharides, xanthan, hydroxyl-ethyl-cellulose, and the like; a cross-linked hydratable gel; a viscosified acid, such as a gel-based acid; an emulsified acid, such as an oil outer phase acid; an energized fluid, such as an $N_2$ or $CO_2$ based foam; and an oil-based fluid, such as a gelled, foamed, or otherwise viscosified oil. Additionally, the carrier fluid may be a brine or may include a brine. In some embodiments, the carrier fluid may include a poly-amino-polycarboxylic acid and is a trisodium hydroxyl-ethyl-ethylene-diamine triacetate, mono-ammonium salt of hydroxyl-ethyl-ethylene-diamine triacetate, and/or a mono-sodium salt of hydroxyl-ethyl-ethylene-diamine tetra-acetate.

A carrier fluid with a sufficient viscosity may have the ability to suspend sand present in the wellbore and carry it to the fracture, thereby further minimizing the chances of a later bridge plug getting stuck and minimizing the length of the near wellbore fracture, which would be left unpropped. The viscosity of the fluid that is sufficient is dependent on the size and specific gravity of the proppant left in the wellbore and to be suspended.

In embodiments, the plugging agent may be made of materials of a manufactured shape, at a loading sufficiently high to be intercepted in the proximity of the wellbore. For example, the loading may be in a range of from about 20 lbs/1000 gal (2.4 g/L) to about 1000 lbs/1000 gal (120 g/L), or in a range of from about 40 lbs/1000 gal (4.8 g/L) to about 750 lbs/1000 gal (90 g/L). The manufactured shape of the plugging agent may be round particles having dimensions that are optimized for plugging. In some embodiments, the materials of the plugging agent may be of different shapes, such as cubes, tetrahedrons, octahedrons, plate-like shapes (flakes), oval, and the like. The materials of the plugging agent may be of any dimension that is suitable for plugging. For example, as described in U.S. Patent Application Publication No. 2012/0285692, the disclosure of which is incorporated by reference herein in its entirety, the plugging agent may including particles having an average particle size of from about 3 mm to about 2 cm, in a particles size a range of from about 5 mm to about 12 mm. Additionally, the plugging agent may additionally include a second amount of particles having an average particle size from about 1.6 to about 20 times smaller than the first average particle size. In some embodiments, the plugging agent may include flakes having an average particle size up to 10 times smaller than the first average particle size.

The manufactured shapes of the materials of the plugging agent may be made of a swellable material. A swellable material may be a material that swells in the presence of hydrocarbons, water, or mixtures thereof. Suitable swellable materials may include, for example, elastomers, swellable resins, swellable polymers, clays, and the like. For example, the material may be cross-linked polyacrylamides and polyacrylic acid derivatives; smectite clay, bentonite; oil-swellable rubber; water-swellable elastomers; and mixtures thereof.

Swellable particulates suitable for use as the plugging agent may be in any form or size, such as grains, spheres, fibers, shaped particulates, beads, balls, and the like. The swellable materials may be degradable or dissolvable in the presence of acids, hydroxides, amines, or other reagents. The swelling time of the particles may be controlled by slowly dissolvable coatings, additives in the base fluid or in the composition of the swellable material, or by changing the temperature. For example, swellable materials and fibers may be suspended in a base fluid, such as slick water, gelled fluids, cross-linked fluids, VES fluids, foams, emulsions, brines, or mixtures thereof.

Other swellable particles may include a modified proppant including a proppant particle and a hydrogel coating, wherein the hydrogel coating is applied to a surface of the proppant particle and localizes on the surface to produce the modified proppant, as disclosed in U.S. Patent Application Publication No. 2013/0233545, the disclosure of which is incorporated by reference herein in its entirety.

Removable Plugging Agents

The removable plugging agents may be any materials, such as solid materials (including, for example, degradable solids and/or dissolvable solids), that may be removed within a desired period of time. In some embodiments, the removal may be assisted or accelerated by a wash containing an appropriate reactant (for example, capable of reacting with one or more molecules of the plugging agent to cleave a bond in one or more molecules in the plugging agent), and/or solvent (for example, capable of causing a plugging agent molecule to transition from the solid phase to being dispersed and/or dissolved in a liquid phase), such as a component that changes the pH and/or salinity. In some embodiments, the removal may be assisted or accelerated by a wash containing an appropriate component that changes the pH and/or salinity. The removal may also be assisted by an increase in temperature, for example when the treatment is performed before steam flooding, and/or a change in pressure.

In some embodiments, the removable plugging agent materials may be degradable material and/or a dissolvable material. A degradable material refers to a material that will at least partially degrade (for example, by cleavage of a chemical bond) within a desired period of time such that no additional intervention is used to remove the plug. For example, at least 30% of the removable material may degrade, such as at least 50%, or at least 75%. In some embodiments, 100% of the removable material may degrade. The degradation of the removable material may be triggered by a temperature change, and/or by chemical reaction between the removable material and another reactant. Degradation may include dissolution of the removable material.

Removable materials for use as the plugging agent may be in any suitable shape: for example, powder, particulates, beads, chips, or fibers. When the removable material is in the shape of fibers, the fibers may have a length of from about 2 to about 25 mm, such as from about 3 mm to about 20 mm. In some embodiments, the fibers may have a linear mass density of about 0.111 dtex to about 22.2 dtex (about 0.1 to about 20 denier), such as about 0.167 to about 6.67 dtex (about 0.15 to about 6 denier). Suitable fibers may degrade under downhole conditions, which may include temperatures as high as about 180° C. (about 350° F.) or more and pressures as high as about 137.9 MPa (about 20,000 psi) or more, in a duration that is suitable for the selected operation, from a minimum duration of about 0.5, about 1, about 2 or about 3 hours up to a maximum of about 24, about 12, about 10, about 8 or about 6 hours, or a range from any minimum duration to any maximum duration.

The removable materials may be sensitive to the environment, so dilution and precipitation properties should be taken into account when selecting the appropriate removable material. The removable material used as a sealer may survive in the formation or wellbore for a sufficiently long duration (for example, about 3 to about 6 hours). The duration should be long enough for wireline services to perforate the next pay sand, subsequent fracturing treatment(s) to be completed, and the fracture to close on the proppant before it completely settles, providing an improved fracture conductivity.

Further suitable removable materials and methods of use thereof include those described in U.S. Patent Application Publication Nos. 2006/0113077, 2008/0093073, and 2012/0181034, the disclosures of which are incorporated by reference herein in their entireties. Such materials include inorganic fibers, for example of limestone or glass, but are more commonly polymers or co-polymers of esters, amides, or other similar materials. They may be partially hydrolyzed at non-backbone locations. Any such materials that are removable (due in-part because the materials may, for example, degrade and/or dissolve) at the appropriate time under the encountered conditions may also be employed in the methods of the present disclosure. For example, polyols containing three or more hydroxyl groups may be used. Suitable polyols include polymeric polyols that solubilizable upon heating, desalination or a combination thereof, and contain hydroxyl-substituted carbon atoms in a polymer chain spaced from adjacent hydroxyl-substituted carbon atoms by at least one carbon atom in the polymer chain. The polyols may be free of adjacent hydroxyl substituents. In some embodiments, the polyols have a weight average molecular weight from about 5000 to about 500,000 Daltons or more, such as from about 10,000 to about 200,000 Daltons.

Further examples of removable materials include polyhdroxyalkanoates, polyamides, polycaprolactones, polyhydroxybutyrates, polyethyleneterephthalates, polyvinyl alcohols, polyethylene oxide (polyethylene glycol), polyvinyl acetate, partially hydrolyzed polyvinyl acetate, and copolymers of these materials. Polymers or co-polymers of esters, for example, include substituted and unsubstituted lactide, glycolide, polylactic acid, and polyglycolic acid. For example, suitable removable materials for use as plugging agents include polylactide acid; polycaprolactone; polyhydroxybutyrate; polyhydroxyvalerate; polyethylene; polyhydroxyalkanoates, such as poly[R-3-hydroxybutyrate], poly[R-3-hydroxybutyrate-co-3-hydroxyvalerate], poly[R-3-hydroxybutyrate-co-4-hydroxyvalerate], and the like; starch-based polymers; polylactic acid and copolyesters; polyglycolic acid and copolymers; aliphatic-aromatic polyesters, such as poly(ε-caprolactone), polyethylene terephthalate, polybutylene terephthalate, and the like; polyvinylpyrrolidone; polysaccharides; polyvinylimidazole; polymethacrylic acid; polyvinylamine; polyvinylpyridine; and proteins, such as gelatin, wheat and maize gluten, cottonseed flour, whey proteins, myofibrillar proteins, casins, and the like. Polymers or co-polymers of amides, for example, may include polyacrylamides.

Removable materials, such as, for example, degradable and/or dissolvable materials, may be used in the plugging agent at high concentrations (such as from about 20 lbs/1000 gal to about 1000 lbs/1000 gal, or from about 40 lbs/1000 gal to about 750 lbs/1000 gal) in order to form temporary plugs or bridges. The removable material may also be used at concentrations at least 4.8 g/L (40 lbs/1,000 gal), at least 6 g/L (50 lbs/1,000 gal), or at least 7.2 g/L (60 lbs/1,000 gal). The maximum concentrations of these materials that can be used may depend on the surface addition and blending equipment available.

Suitable removable plugging agents also include dissolvable materials and meltable materials (both of which may also be capable of degradation). A meltable material is a material that will transition from a solid phase to a liquid phase upon exposure to an adequate stimulus, which is generally temperature. A dissolvable material (as opposed to a degradable material, which, for example, may be a material that can (under some conditions) be broken in smaller parts by a chemical process that results in the cleavage of chemical bonds, such as hydrolysis) is a material that will transition from a solid phase to a liquid phase upon exposure to an appropriate solvent or solvent system (that is, it is soluble in one or more solvent). The solvent may be the carrier fluid used for fracturing the well, or the produced fluid (hydrocarbons) or another fluid used during the treatment of the well. In some embodiments, dissolution and degradation processes may both be involved in the removal of the plugging agent.

Such removable materials, for example dissolvable, meltable and/or degradable materials, may be in any shape: for example, powder, particulates, beads, chips, or fibers. When the such material is in the shape of fibers, the fibers may have a length of about 2 to about 25 mm, such as from about 3 mm to about 20 mm. The fibers may have any suitable denier value, such as a denier of about 0.1 to about 20, or about 0.15 to about 6.

Examples of suitable removable fiber materials include polylactic acid (PLA) and polyglycolide (PGA) fibers, glass fibers, polyethylene terephthalate (PET) fibers, and the like.

In some embodiments, the plugging agent content may include pre-processed fiber flocks, which represent solids entrapped inside a fiber network.

Non-Removable Material

In some embodiments, the plugging agent may be a non-removable material, which is a material that does not at least partially degrade within a desired period of time. Non-degradable materials suitable for use as a plugging agent include cement, proppant and material of proppant-like composition (for example, ceramics, sands, bauxites). The non-degradable materials form a non-degradable (and/or non-dissolvable) plug, which may subsequently be at least partially or completely removed using other means, such as coil tubing or an abrasive, such as sand.

The foregoing is further illustrated by reference to the following examples, which are presented for purposes of illustration and are not intended to limit the scope of the present disclosure.

EXAMPLES

In a first example, a horizontal well is fractured in sections, which are mechanically isolated by bridge plugs. Each section is 300 feet long and has six 1-foot perforation clusters, which are separated by 50 feet. Each perforation cluster contains six perforations. The perforations are at a measured depth such that the displacement volume from the wellhead to the perforations is about 300 barrels (bbl).

A fracturing stage containing 80,000 pounds (lbs) of proppant was pumped into the well to place the proppant. After the proppant has been placed, about 20 bbl of a spacer was pumped, following by the pumping of a plugging agent. The plugging agent included (i) 50 lbs of degradable particles having a size distribution ranging from about 3 mm to 100 mesh, and (ii) 8.4 lbs of fibers in 5 bbl of 25-lb linear gel. This corresponds to 238 lbs/1000 gal of particles and 40 lbs/1000 gal of fiber.

The plugging agent was fed from a high-loading stream, which is injected at about 8 bbl/min while the fracturing pumps are pumping linear gel at about 42 bbl/min to bring the total injection rate to about 50 bbl/min. The high-loading stream was therefore "diluted" in the fracturing stream and the downhole pill has the properties shown in the following Table.

TABLE 1

| Downhole pill components. | | |
| --- | --- | --- |
| Volume of pill | bbl | 30 |
| Particle loading | lbs/1000 gal (ppt) | 40 |
| Fiber loading | ppt | 50 |

The pill was displaced with approximately 350 bbl of solid-free, cross-linked fluid. Right after the proppant was squeezed in the perforations, the injection rate was dropped from 50 bbl/min to 20 bbl/min in order to keep the plugging material functional. The time used to slow down the pump dictates the volume of the spacer between the last of the proppant, which was pumped in the perforations at full rate, and the start of the plugging agent, which was squeezed in the perforations at a lower rate.

As shown in FIG. 2, the surface pressure increased by about 3100 psi when the plugging agent hit the sandface. The gain in treatment pressure evidences that some perforation plugs are plugged. The increase in pressure is followed by a sudden drop in pressure of about 1000 psi, which shows that perforations that were left un-stimulated during the fracturing stage are now open and ready to take on the displacing fluid, while the perforations where the proppant had been previously placed are plugged by the plugging agent.

Afterwards, a bridge plug was pumped into the wellbore, and the subsequent section was completed similarly to the first section described above. In the process of flushing the wellbore and pumping down the wellbore, the proppant was not being swept deeper into the fracture, as the fluid is directed to perforations which had not been stimulated during the pad-to-flush sequence.

Although the preceding description has been described herein with reference to particular means, materials and embodiments, it is not intended to be limited to the particulars disclosed herein; rather, it extends to all functionally equivalent structures, methods and uses, such as are within the scope of the appended claims. Furthermore, although only a few example embodiments have been described in detail above, those skilled in the art will readily appreciate that many modifications are possible in the example embodiments without materially departing from the disclosure of METHODS FOR MINIMIZING OVERDISPLACEMENT OF PROPPANT IN FRACTURE TREATMENTS. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112(f) for any limitations of any of the claims herein, except for those in which the claim expressly uses the words 'means for' together with an associated function.

What is claimed is:

1. A method of treating a subterranean formation penetrated by a wellbore comprising:
   generating a fracture in the subterranean formation;
   injecting a treatment fluid into the wellbore at a fluid pressure equal to or greater than a fracture initiation pressure of the subterranean formation, wherein the treatment fluid is used to transport a predetermined amount of a proppant into the wellbore;
   while the treatment fluid is being injected, introducing a plugging agent without lowering the fluid pressure, wherein the plugging agent is introduced into the treatment fluid after the entire predetermined amount of the proppant is introduced into the wellbore, but before the entire predetermined amount of proppant reaches the fracture, wherein the method further comprises pumping a volume of spacer between a tail end of the proppant and a leading edge of the plugging agent, said volume being less than a volume of the wellbore between a surface opening of the wellbore and the fracture to be plugged with the degradable plug; and
   forming a removable plug from the plugging agent in the fracture thus preventing overdisplacement of proppant that entered the fracture.

2. The method of claim 1, wherein the plugging agent comprises a material selected from the group consisting of a removable material, and a non-removable material.

3. The method of claim 2, wherein:
   the plugging agent is a removable material that comprises a degradable material, and
   the method further comprises allowing the degradable material to at least partially degrade after a predetermined period of time.

4. The method of claim 2, wherein:
   the plugging agent is a removable material that comprises a dissolvable material, and
   the method further comprises allowing the dissolve material to at least partially dissolve after a predetermined period of time.

5. The method of claim 1, wherein the plugging agent is introduced into the treatment fluid with the last 1 wt % of the predetermined amount of proppant that is injected into the wellbore.

6. The method of claim 1, wherein the plugging agent is introduced into the treatment fluid at a time that is in a range of from about 2 seconds to about 180 seconds after the entire predetermined amount of proppant has been injected into the wellbore.

7. The method of claim 1, further comprising performing a downhole operation after the degradable plug is formed.

8. The method of claim 1, wherein the treatment fluid is injected into the wellbore at a rate in a range of from about 20 barrels per minute (bbl/min) (2.38 m$^3$/min) to about 120 barrels per minute (bbl/min)(14.31 m$^3$/min).

9. The method of claim 1, further comprising:
   placing a bridge plug in the wellbore between a surface opening of the wellbore and the fracture.

10. The method of claim 9, wherein no bridge plug or sand plug is placed in the wellbore before fracturing a subsequent layer.

11. The method of claim 9, wherein a fluid phase of the slurry comprises one or more member selected from the group consisting of a viscoelastic surfactant, a co-surfactant, and a rheology modifier.

* * * * *